United States Patent

Yousouf et al.

(10) Patent No.: US 9,063,746 B2
(45) Date of Patent: Jun. 23, 2015

(54) DEPLOYMENT OF SOFTWARE APPLICATIONS ON A CLOUD COMPUTING PLATFORM

(75) Inventors: Shenol Yousouf, Sofia (BG); Georgi Stanev, Sofia (BG)

(73) Assignee: SAP SE, Walldorf (DE)

( * ) Notice: Subject to any disclaimer, the term of this patent is extended or adjusted under 35 U.S.C. 154(b) by 426 days.

(21) Appl. No.: 13/530,143

(22) Filed: Jun. 22, 2012

(65) Prior Publication Data

US 2013/0346945 A1 Dec. 26, 2013

(51) Int. Cl.
*G06F 9/44* (2006.01)
*G06F 9/445* (2006.01)

(52) U.S. Cl.
CPC ..... *G06F 8/36* (2013.01); *G06F 8/60* (2013.01)

(58) Field of Classification Search
CPC ........................................................ G06F 9/445
USPC ........................................................ 717/121
See application file for complete search history.

(56) References Cited

U.S. PATENT DOCUMENTS

| 7,263,697 | B2 * | 8/2007 | Acker et al. ................... 717/168 |
| 7,426,523 | B2 * | 9/2008 | Schroeder et al. .................... 1/1 |
| 7,506,338 | B2 * | 3/2009 | Alpern et al. .................. 717/177 |
| 7,870,549 | B2 * | 1/2011 | Acker et al. ................... 717/168 |
| 8,281,307 | B2 * | 10/2012 | Arnold et al. ...................... 718/1 |
| 2004/0210570 | A1 * | 10/2004 | Shin ................................ 707/3 |
| 2009/0228879 | A1 * | 9/2009 | Blohm et al. ................. 717/174 |
| 2013/0191339 | A1 * | 7/2013 | Haden et al. .................. 707/638 |
| 2013/0332900 | A1 * | 12/2013 | Berg et al. ..................... 717/121 |
| 2013/0346945 | A1 * | 12/2013 | Yousouf et al. ............... 717/121 |

* cited by examiner

*Primary Examiner* — Don Wong
*Assistant Examiner* — Theodore Hebert

(57) ABSTRACT

In one aspect, a software application with application artifacts is deployed on a cloud computing platform. The cloud computing platform includes a platform product that can provide functionality that is required by the application. Application metadata is created based on analyzing the application artifacts and describes the application artifacts requirement. An application repository stores the application artifacts and the application metadata. A product description defines an application product for the software application and a product reference to the platform product is defined. The product description and the product reference are published in the application repository to update the application metadata. A composite repository refers to the application product and the platform product. The composite repository is transferred to a platform repository provided by the cloud computing platform.

20 Claims, 6 Drawing Sheets

DEPLOYMENT OF SOFTWARE APPLICATIONS ON A CLOUD COMPUTING PLATFORM

BACKGROUND

Software complexity is increasing resulting in changes to product cycles, requirements and modes of delivery of software applications. Customers' needs are being transformed to request flexibility in terms of processes, landscape and software components. Development of new software applications often relies on existing, previously developed functionality. Typically, software applications can adopt or get access to different services and capabilities from other software offerings. It is a common use case to adapt existing functionality to perform in a new environment. There are a number of scenarios for providing software components or entire applications for reuse by customers or end user. For example, software platforms can provide functionality that can be extended and therefore new applications can be built on top of them.

Cloud computing is the delivery of computing resources as a service over a network (e.g., the Internet). Software-as-a-Service (SaaS) is a type of a solution, where a cloud service provider allows software applications and various hardware and software resources on-demand when requested by an end user (e.g., customer). A customer of on-demand applications is free from the procurement and maintenance of the hardware and software needed for executing the applications. Platform-as-a-Service (PaaS) is another category of cloud computing solutions that provides the computing platform including operating system, programming language execution environment, database, and web server to facilitate the development and deployment of on-demand applications and services.

PaaS is a growing technology space offering possibilities for optimization of information technology (IT) spending. It provides facilities required to support the lifecycle of web applications and services, available from the Internet. Applications can run as a SaaS on the infrastructure that is provided from a PaaS provider. PaaS may give application developers the tools to design, develop, test, deploy and host their software applications, as well as use of application services and infrastructure. Typically, when an application is deployed on a given PaaS, it is expected to find it provisioned and ready to be installed and stared. Depending on the complexity of the solution, the provisioning process may involve a series of tedious tasks prone to errors.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
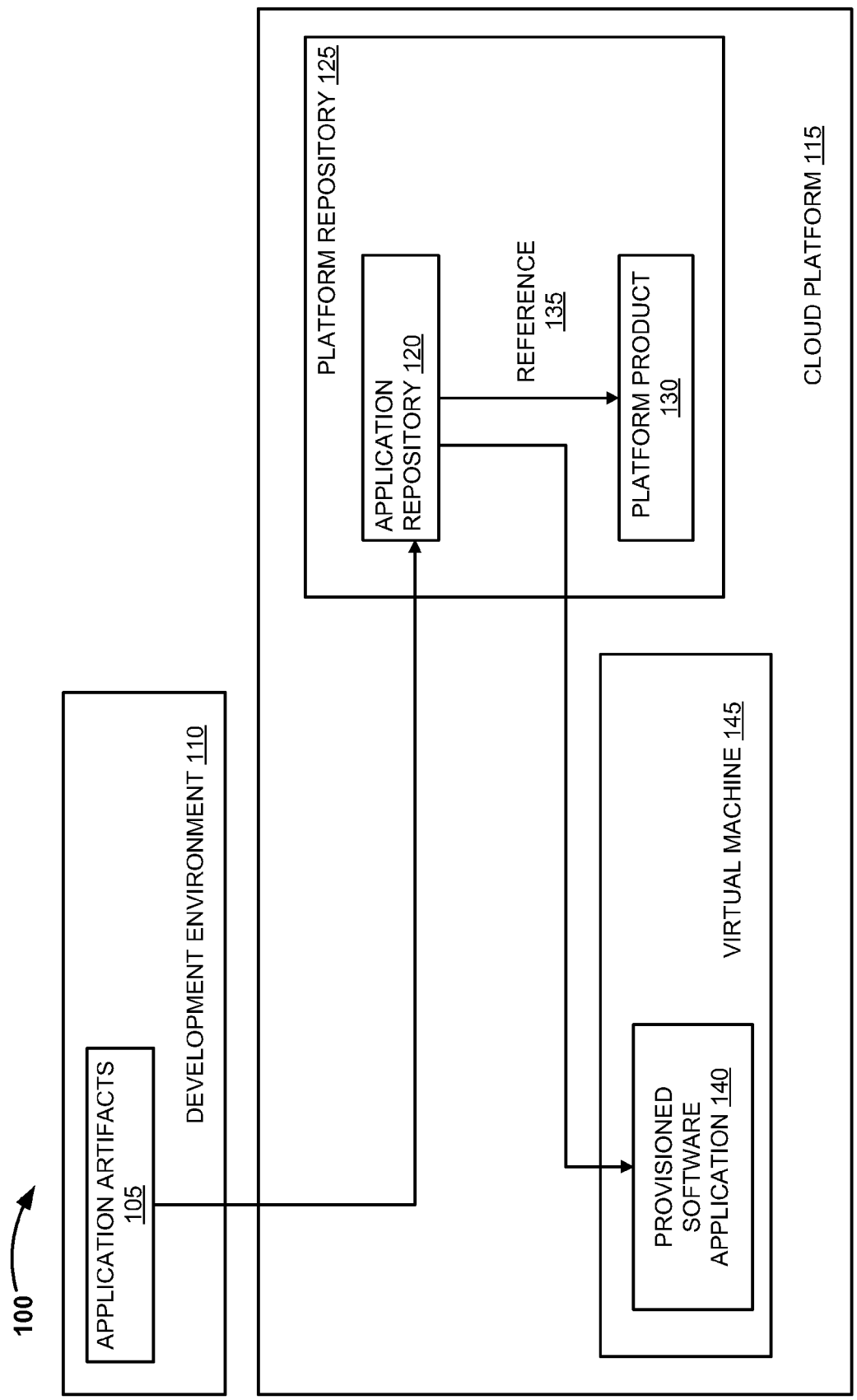
FIG. 1 is a block diagram illustrating an embodiment of an environment for provisioning of a software application on a cloud platform referring to a platform product.

Embodiments of techniques for deployment of software application on a cloud computing platform are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In one embodiment, software applications can be developed based on available platforms or platform products to build new functionality as an extension to the existing functionality. For example, a platform can be provided by a third party, e.g. a cloud computing platform that allows provisioning of the software application in a cloud environment. A PaaS solution may provide an application runtime, user interface (UI) development toolkits, enterprise services, internal configuration, etc. that can be adopted and used in the development of the software application. In another embodiment, PaaS offerings may provide support in the lifecycle process of a given application in the process of deployment, installation and maintenance of fully-functional applications that are built and run on a given PaaS. A provisioning process can prepare the application containing software components (e.g., both application components and infrastructural components) together with the right configuration in the execution environment. In one embodiment, the infrastructural components can be software entities provided by the platform, e.g. platform services, core runtime, etc. In another embodiment, the PaaS solution may take care of uniting the provided platform's infrastructural components and separately developed application components for a given application. Thus, the application would be deployed and ready to be started.

Eclipse® development platform provides frameworks where plug-in extensions can be created. Software developers, including commercial vendors, can build, brand, and package products using the platform as a base technology. These products can be sold and supported commercially. Therefore, the efficient provisioning of the developed products is especially important. The Eclipse® development platform could be used to develop applications in various programming languages, such as, but not limited to, Java®, Perl®, C®, C++®, PHP®, etc. An Eclipse®-based product is a stand-alone program, e.g., self-contained and installable software application, built with the Eclipse®-based development platform. A product may optionally be packaged and delivered as one or more features. A feature may correspond to a particular functionality of the product or the application, and usually groups a number of unitary software components that could be managed together as a single entity. According to the terminology adopted in Eclipse® projects, such unitary software components are called plugins. The plugins are the basic installable and executable units or software code structures built by the Eclipse® developers.

By definition, products include all the code (e.g., plugins) needed to run the corresponding applications. For example, a product may include a newly developed Java® based application, a Java® Runtime Environment (JRE) and the Eclipse® platform code. The current Eclipse® provisioning platform (p2) requires that the plugins, the JRE, and the necessary Eclipse® platform code have to be packaged and installed together as a single product. In one embodiment, packaging different types of application plugins together can be substituted with references in the product definition to the necessary parts. In one embodiment, these parts can be defined also as products.

There are different technology solutions that may implement provisioning of applications in a cloud environment together with an existing platform product provided by an on-demand platform. For example, the Equinox p2 provisioning platform for Open Services Gateway initiative (OSGi®)-based applications. The p2 platform is part of the Equinox project of Eclipse®. The Equinox p2 provisioning platform includes a general-purpose provisioning infrastructure that can be used for provisioning a variety of applications.

FIG. 1 is a block diagram illustrating an embodiment of an environment 100 for provisioning a software application on a cloud platform referring to a platform product. Application artifacts 105 are developed in a development environment 110. In one embodiment, the development environment 110 can be part of an on-demand platform. The application artifacts 105 are developed for a software application that is reusing external functionality. The software application can be built on top of a base functionality provided by a cloud computing platform offering, such as a cloud platform 115. In one embodiment, the base functionality can be provided by a platform product 130 that persists in a platform repository 125 on the cloud platform 115. When the application artifacts 105 are deployed on the cloud platform 115, an application repository 120 is created on the platform repository 125. The application repository contains the definition of an installable format of a software application and contains a reference 135 to the platform product 130. The software application can be installed and started on a virtual machine 145. A provisioned software application 140 is accessible for end-users and can serve requests from a network. In one embodiment, the provisioned software application 140 can be accessed from a web browser over an Internet connection.

Figure 2:
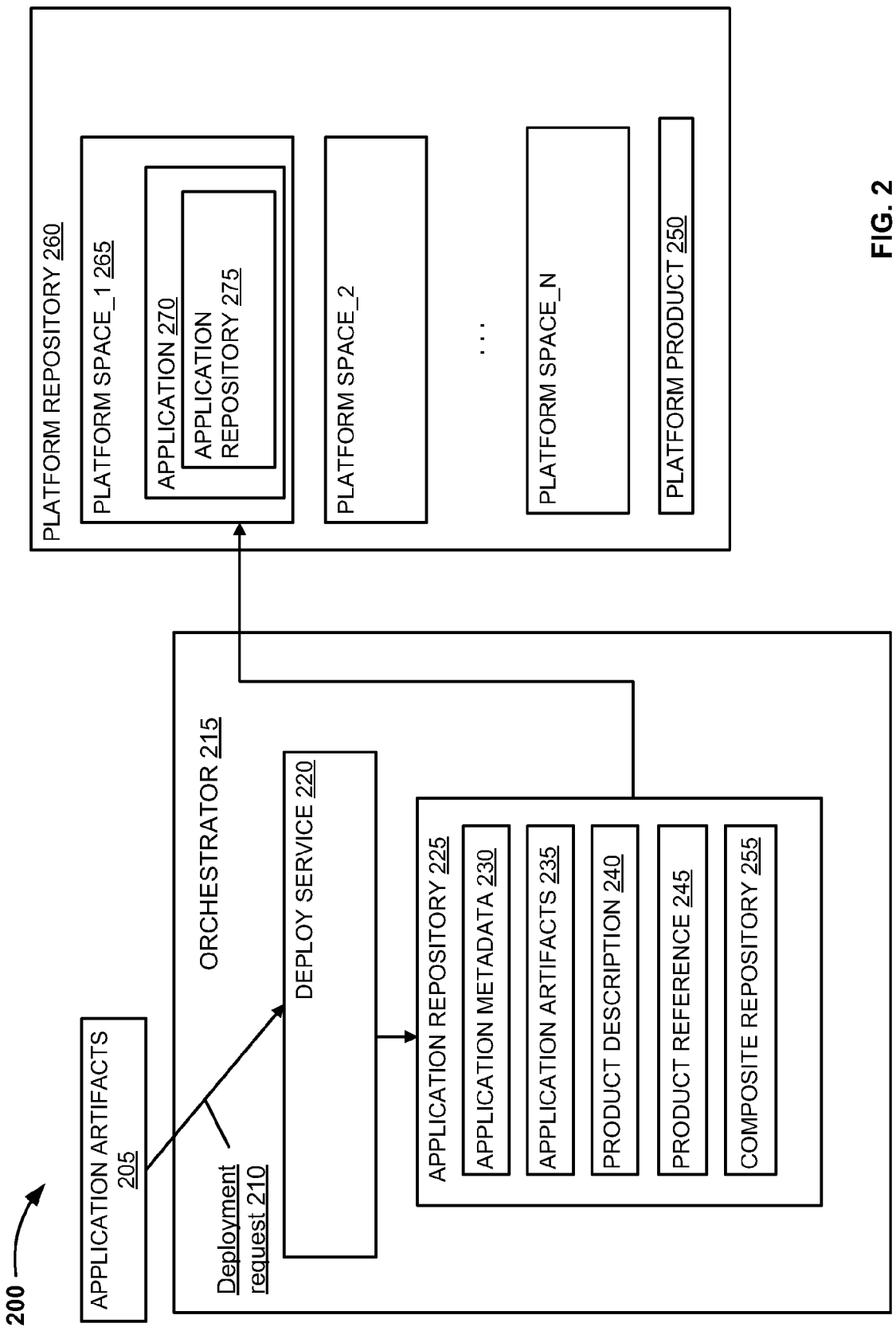
FIG. 2 is a block diagram illustrating an embodiment of an environment for deploying a software application on a cloud computing platform providing a platform product.

FIG. 2 is a block diagram illustrating an embodiment of an environment 200 for deploying a software application on a cloud computing platform providing a platform product. According to one definition, a software product is a self-contained entity installable and executable on a specified type or types of computer system hardware and software (e.g., operation system). A product is a framework or a shell including functionality that operates in a synchronized manner to provide different services. A description of a product may provide metadata, configuration and even source code necessary for the deployment and installation of the product and the included functionality. Once installed in a computer system landscape, a product could be independently managed, e.g., configured, started, stopped, accessed, etc. The different functionalities of a product cannot be installed standalone or managed independently, because the product description, e.g., the product shell, provides the necessary means to access the functionalities, such as, interfaces, dependencies, relationships, etc. In one embodiment, a product can provide the necessary runtime environment to execute the applications.

In one embodiment, the software product may represent an application that requires additional functionality in order to be executed. Application artifacts 205 are developed for the software application. In one embodiment, the additional functionality can be provided from a cloud computing platform and thus the application can be started in a cloud environment. The application runs as a SaaS on top of the cloud computing platform. A deployment request 210 can be sent to an orchestrator 215 to deploy the application artifacts 205 on the cloud computing platform. In one embodiment, the orchestrator 215 can manage the lifecycle of developed and deployed software application on the cloud computing platform. In one embodiment, the orchestrator 215 can be a virtual machine (VM) that takes care to deploy, start, and stop the applications. In another embodiment, the orchestrator 215 can install the application on different VMs, where the application is accessed by end users. In one embodiment, the orchestrator 215 can automatically provision more than one VM to host one application. This is performed without the need of an additional interaction, for example, from a user.

The application artifacts 205 can be provided for deployment directly from an Integrated Development Environment (IDE) or from a customer's repository. In one embodiment, the customer's repository can be accessed from a network location, for example, on a specified uniform resource locator (URL). For example, Eclipse® provisioning mechanism p2 may be utilized to generate the customer's repository to be a p2 repository. The application artifacts 205 can be compiled and built. In one embodiment, the application artifacts 205 can be OSGi™ bundles. In another embodiment, the application artifacts 205 may be included in one or more Java® ARchive (JAR or .jar) binary files, or one or more Web application ARchive (WAR) files. The different files may be stored in one or more folders. In one embodiment, the deployment request 210 can transfer the application artifacts to a deploy service 220 in the orchestrator 215. When the deploy service 220 receives the deployment request 210, the application artifacts 205 are analyzed to determine application artifacts requirements. In one embodiment, the metadata of the artifacts can be analyzed. Application metadata is created based on the analysis.

In one embodiment, the application artifacts may include metadata information that can be stored in a "META-INF" folder in a "manifest.mf" file. The "manifest.mf" file is part of a standard specification to which OSGi™ adds additional metadata. Any non-OSGi™ runtime will ignore the OSGi™ metadata. OSGi™ bundles can be used without restrictions in non-OSGi™ Java®-based environment.

The deploy service 220 creates an application repository 225 and publishes application metadata 230 and application artifacts 235 in the application repository 225. In one embodiment, the application repository 225 can be published with the Equinox p2 Publisher. According to the Eclipse® terminology, the p2 Publisher provides means to add deployable entities into p2 repositories from a number of different sources. In another embodiment, the application metadata 230 describes the application requirements of the received application artifacts 205. For example, the requirements can be provided from an on-demand runtime platform, a cloud computing platform, or other PaaS offering. In another embodiment, part of the requirements can be provided from another software offering or more than one software offerings, which also have to be included in the deployment process on the cloud computing platform. The application artifacts 235 correspond to the application artifacts 205 received from the deployment request 210. In one embodiment, the application artifacts 235 can be converted versions of the application artifacts 205. For example, WAR files can be converted to Web application bundles (WABs), when the software application that is provisioned is an OSGi™-based application.

In one embodiment, the application repository 225 can be a p2 repository created based on the p2 provisioning mechanism provided by Eclipse®. In one embodiment, the application metadata 230 can be p2 metadata that contains useful information about the elements that can be installed. The p2 provisioning process may generate metadata describing installable units (IUs). The application metadata 230 describes the different elements of a product to be installed. The format of the application metadata 230 can be, for example, a text file of certain format. In one embodiment, the application metadata 230 can also describe physical characteristics of the application artifacts 235. In addition, the application metadata describes requirements of the application artifacts 235 and their provided capabilities. In one embodiment, the requirements of the application artifacts 235 can be requirements for functionality that can be provided by already implemented enterprise services, runtime infrastructure, etc. These requirements can be provided by the cloud computing platform that is used for deploying the software product that is defined for the software application.

The below Table 1 shows parts of exemplary application metadata included in file "content.xml", such as the application metadata 230 that is published in the p2 application repository after analyzing the received application artifacts for deployment. The application metadata 230 can include configuration information for the described IUs.

TABLE 1

| content.xml |
|---|
| <?xml version="1.0" encoding="UTF-8" ?> <br>    <?metadataRepository version='1.1.0'?> <br>            ............ <br> <properties size="2"> <br>    <property name="p2.timestamp" value="1331557616048" /> <br>    <property name="p2.compressed" value="false" /> <br>    </properties> <br> <units size="8"> <br> <unit id="tooling.source.default" version="1.0.0" singleton="false"> <br>    <hostRequirements size="1"> <br>    <required namespace="org.eclipse.equinox.p2.eclipse.type" name="source" range="0.0.0" optional="true" multiple="true" greedy="false" /> <br>    </hostRequirements> <br>    <properties size="1"> <br>    <property name="org.eclipse.equinox.p2.type.fragment" value="true" /> <br>    </properties> <br>    <provides size="2"> <br>    <provided namespace="org.eclipse.equinox.p2.iu" name="tooling.source.default" version="1.0.0" /> <br>    <provided namespace="org.eclipse.equinox.p2.flavor" name="tooling" version="1.0.0" /> <br>    </provides> <br>    <requires size="1"> <br>    <required namespace="org.eclipse.equinox.p2.eclipse.type" name="source" range="0.0.0" optional="true" multiple="true" greedy="false" /> <br>    </requires> <br>    <touchpoint id="null" version="0.0.0" /> <br>    <touchpointData size="1"> <br>    <instructions size="2"> <br>    <instruction key="install">addSourceBundle(bundle:${artifact})</instruction> <br>    <instruction key="uninstall">removeSourceBundle(bundle:${artifact})</instruction> <br>    </instructions> <br>    </touchpointData> <br>    </unit> <br>            ............ <br> <unit id="a.jre.javase" version="1.6.0" singleton="false"> <br> <provides size="159"> <br>   <provided namespace="org.eclipse.equinox.p2.iu" name="a.jre.javase" version="1.6.0" /> <br>    <provided namespace="java.package" name="javax.accessibility" version="0.0.0" /> <br>    <provided namespace="java.package" name="javax.activation" version="0.0.0" /> <br>    <provided namespace="java.package" name="javax.activity" version="0.0.0" /> <br>    <provided namespace="java.package" name="javax.annotation" version="0.0.0" /> <br>            ................ <br>    <provided namespace="java.package" name="org.xml.sax.helpers" version="0.0.0" /> <br>    </provides> <br>    <touchpoint id="org.eclipse.equinox.p2.native" version="1.0.0" /> <br>    </unit> <br> <unit id="tooling.osgi.bundle.default" version="1.0.0" singleton="false"> <br>    <hostRequirements size="1"> <br>    <required namespace="org.eclipse.equinox.p2.eclipse.type" name="bundle" |

TABLE 1-continued content.xml

```
range="0.0.0" multiple="true" greedy="false" />
    </hostRequirements>
<properties size="1">
    <property name="org.eclipse.equinox.p2.type.fragment" value="true" />
    </properties>
    <provides size="2">
    <provided namespace="org.eclipse.equinox.p2.iu" name="tooling.osgi.bundle.default"
version="1.0.0" />
    <provided namespace="org.eclipse.equinox.p2.flavor" name="tooling" version="1.0.0"
/>
    </provides>
  <requires size="1">
    <required namespace="org.eclipse.equinox.p2.eclipse.type" name="bundle"
range="0.0.0" multiple="true" greedy="false" />
    </requires>
    <touchpoint id="null" version="0.0.0" />
  <touchpointData size="1">
  <instructions size="4">
    <instruction key="install">installBundle(bundle:${artifact})</instruction>
    <instruction key="uninstall">uninstallBundle(bundle:${artifact})</instruction>
    <instruction key="unconfigure" />
    <instruction key="configure">setStartLevel(startLevel:4);</instruction>
    </instructions>
    </touchpointData>
    </unit>
      <unit id="toolingmyAdditionalProduct.configuration" version="0.0.0">
      <provides size="1">
    <provided namespace="org.eclipse.equinox.p2.iu"
name="toolingmyAdditionalProduct.configuration" version="0.0.0" />
    </provides>
    <touchpoint id="null" version="0.0.0" />
    </unit>
      <unit id="tooling.org.eclipse.update.feature.default" version="1.0.0"
singleton="false">
<hostRequirements size="1">
    <required namespace="org.eclipse.equinox.p2.eclipse.type" name="feature"
range="0.0.0" optional="true" multiple="true" greedy="false" />
    </hostRequirements>
      <properties size="1">
    <property name="org.eclipse.equinox.p2.type.fragment" value="true" />
    </properties>
    <provides size="2">
    <provided namespace="org.eclipse.equinox.p2.iu"
name="tooling.org.eclipse.update.feature.default" version="1.0.0" />
    <provided namespace="org.eclipse.equinox.p2.flavor" name="tooling" version="1.0.0"
/>
    </provides>
<requires size="1">
    <required namespace="org.eclipse.equinox.p2.eclipse.type" name="feature"
range="0.0.0" optional="true" multiple="true" greedy="false" />
    </requires>
    <filter>(org.eclipse.update.install.features=true)</filter>
    <touchpoint id="null" version="0.0.0" />
<touchpointData size="1">
<instructions size="2">
    <instruction
key="install">installFeature(feature:${artifact},featureId:default,featureVersion:def
ault)</instruction>
    <instruction
key="uninstall">uninstallFeature(feature:${artifact},featureId:default,featureVersio
n:default)</instruction>
    </instructions>
    </touchpointData>
    </unit>
<unit id="config.a.jre.javase" version="1.6.0" singleton="false">
<hostRequirements size="1">
    <required namespace="org.eclipse.equinox.p2.iu" name="a.jre.javase" range="1.6.0"
/>
    </hostRequirements>
<properties size="1">
    <property name="org.eclipse.equinox.p2.type.fragment" value="true" />
    </properties>
<provides size="1">
    <provided namespace="org.eclipse.equinox.p2.iu" name="config.a.jre.javase"
version="1.6.0" />
    </provides>
    <requires size="1">
    <required namespace="org.eclipse.equinox.p2.iu" name="a.jre.javase" range="1.6.0"
```

TABLE 1-continued content.xml

```
    />
      </requires>
      <touchpoint id="org.eclipse.equinox.p2.native" version="1.0.0" />
      <touchpointData size="1">
      <instructions size="1">
      <instruction key="install" />
      </instructions>
      </touchpointData>
      </unit>
      <unit id="MyAdditionalBundle" version="1.0.0.201203121459" singleton="false">
      <update id="MyAdditionalBundle" range="[0.0.0,1.0.0.201203121459)" severity="0"
/>
<properties size="1">
      <property name="org.eclipse.equinox.p2.name" value="MyAdditionalBundle" />
      </properties>
<provides size="3">
      <provided namespace="org.eclipse.equinox.p2.iu" name="MyAdditionalBundle"
version="1.0.0.201203121459" />
      <provided namespace="osgi.bundle" name="MyAdditionalBundle"
version="1.0.0.201203121459" />
      <provided namespace="org.eclipse.equinox.p2.eclipse.type" name="bundle"
version="1.0.0" />
      </provides>
<artifacts size="1">
      <artifact classifier="osgi.bundle" id="MyAdditionalBundle"
version="1.0.0.201203121459" />
      </artifacts>
      <touchpoint id="org.eclipse.equinox.p2.osgi" version="1.0.0" />
    <touchpointData size="1">
      <instructions size="1">
      <instruction key="manifest">Bundle-SymbolicName: MyAdditionalBundle Bundle-
Version: 1.0.0.201203121459</instruction>
      </instructions>
      </touchpointData>
      </unit>
      </units>
                            . . . . . . . . . . . .
      </repository>
```

The below Table 2 represents exemplary part of application metadata (such as the application metadata 230), describing information about the application artifacts that can be used during the installation of the software application. For example, the actual size of the application artifacts. The "artifacts.xml" file includes metadata regarding the installable code, e.g., the binary file (or files) corresponding to application artifacts developed for the software application:

TABLE 2 artifacts.xml

```
<?xml version="1.0" encoding="UTF-8" ?>
    <?artifactRepository version='1.1.0'?>
<repository name=". . ."
type="org.eclipse.equinox.p2.artifact.repository.simpleRepository" version="1.0.0">
<properties size="2">
    <property name="p2.timestamp" value="1331557616038" />
    <property name="p2.compressed" value="false" />
    </properties>
<mappings size="3">
    <rule filter="(& (classifier=osgi.bundle))"
output="${repoUrl}/plugins/${id}_${version}.jar" />
      <rule filter="(& (classifier=binary))" output="${repoUrl}/binary/${id}_${version}" />
      <rule filter="(& (classifier=org.eclipse.update.feature))"
output="${repoUrl}/features/${id}_${version}.jar" />
      </mappings>
<artifacts size="1">
<artifact classifier="osgi.bundle" id="MyAdditionalBundle"
version="1.0.0.201203121459">
<properties size=". . .">
    <property name="artifact.size" value="370" />
                             . . . . . .
    </properties>
    </artifact>
                             . . . . . .
    </artifacts>
    </repository>
```

As illustrated in Table 1, the "content.xml" file describes the IUs with their dependencies and configurations. The IUs described in the application metadata are presented with their provided and required capabilities. According to the Eclipse® terminology, the described IUs correspond to features and plugins. As Table 2 shows, the artifacts may be developed in the terms of the Open Services Gateway initiative (OSGi™) framework. The artifact binaries (e.g., OSGi™ bundle file "MyAdditionalBundle", according to the definition in Table 1), may be stored in a "plugins" subfolder on the location of the application repository 225, where the metadata files are also stored.

In one embodiment, the software application can be deployed as an Eclipse®-based product. An Eclipse®-based product is a stand-alone program, e.g., self-contained and installable software, built using the Eclipse® development platform. A product may optionally be packaged and delivered as one or more of so called features. A feature may correspond to a particular functionality of the product or the application, and usually groups a number of unitary software artifacts that could be managed together as a single entity. According to the terminology adopted in Eclipse® projects, such unitary software artifacts are called plugins. The plugins are the basic installable and executable units or software code structures built by the Eclipse® developers.

When an application is developed to include features or functionality provided by an additional software application, for example a cloud computing platform, a new product may be defined to frame or brand the new application, according to one embodiment. Table 3 shows the content of an exemplary product description in a file "myApplicationProduct.product" in eXtensible Markup Language (XML) file format.

TABLE 3 myApplicationProduct.product

```
<?xml version="1.0" encoding="UTF-8"?>
<?pde version="3.5"?>
<product useFeatures="false" id="myAdditionalProduct">
  <configIni use="default">
  </configIni>
  <plugins>
    <plugin id="MyAdditionalBundle"/>
  </plugins>
</product>
```

In one embodiment, a product description 240, such as the description in file "myApplicationProduct.product" is created to define an application product (with id "myAdditionalProduct", as presented in Table 3) for the software application that is developed on top of functionality provided by a cloud computing platform. For example, the functionality can be provided from one or more platform products available on the cloud computing platform. In one embodiment, the application product defines the application artifacts 235 (for example, as features and plug-ins) that are developed for the software application that is being deployed. In another embodiment, a software application that is deployed on a cloud computing platform can use a platform product, defined by the cloud computing platform. For example, the platform product can be defined in a file in XML format. In one embodiment, the product can be defined to describe functionality that is provided from the cloud computing platform, such as enterprise services, runtime environment. For example, the enterprise services can include services such as a persistency service, identity service, mail service, etc. In one embodiment, the platform product can include a core runtime environment, such as a Java® application server.

In one embodiment, the connection between the application product and a platform product 250 may be defined with an additional entry in a product reference 245. For example, the reference to the platform product may be included in an additional descriptor file, e.g., file "p2.inf", as shown in Table 4. In one embodiment, the "p2.inf" file presents an exemplary product reference, such as the product reference 245.

The "p2.inf" file can be used to specify the platform product that can be used to provide the application artifacts requirements of the application artifacts 235 that are defined in the application metadata 230. According to Table 4, the reference to the platform product is defined by the platform product's name—"myPlatformProduct".

TABLE 4 p2.inf

```
...
requires.0.name = myPlatformProduct
requires.0.namespace = org.eclipse.equinox.p2.iu
requires.0.range = 0.0.0
......
```

In another embodiment, the "p2.inf" file can specify the required functionality provided by the platform product, for example, the enterprise services provided by the platform product. In one embodiment, a reference can be defined from the "p2.inf" file to an identity management service that is provided as an enterprise service from the platform product "myPlatformProduct". The reference to the identity management service can be defined in the "p2.inf" file by the name of the service as in Table 5 presented below. The product reference can include also a reference to the software application that is deployed on the cloud computing platform. For example, the software application can be a web application named "HelloMail" and the "p2.inf" file can refer to the web application as presented in Table 5.

TABLE 5 p2.inf

```
...
requires.1.name= HelloMail
requires.1.namespace=org.eclipse.equinox.p2.iu
requires.1.range=1.0.0.qualifier
....
requires.4.name=com.sap.jpaas.service.identitymanagement.feature.group
requires.4.namespace=org.eclipse.equinox.p2.iu
requires.4.range=0.0.0
......
```

In one embodiment, the product description 240 and the product reference 245 can be published in the application repository 225. In such manner, the application metadata 230 that persist in the application repository 225 can be updated and includes description of the platform product 250.

Table 6 represents exemplary pieces of metadata that can be generated and inserted in the application metadata 230 after publishing the product description 240 and the product reference 245 in the application repository 225. Table 5 presents description of the IUs that are additionally defined in the application metadata after publishing the product description 240 for the application product and the product reference 245 to the platform product 250. In one embodiment, the description of the application product in the updated application metadata can refer to the name of the platform product that is provided by the cloud computing platform—"myPlatformProduct". The platform product provides functionality that is required by the application product. In one embodiment, the presented pieces of metadata presented in Table 5 can be inserted in the application metadata file "content.xml" (presented in Table 1).

TABLE 6 content.xml

```
...
<unit id="myAdditionalProduct" version="0.0.0">
  <update id="myAdditionalProduct" range="0.0.0" severity="0" />
<properties size="3">
  <property name="org.eclipse.equinox.p2.name" value="myAdditionalProduct" />
  <property name="lineUp" value="true" />
  <property name="org.eclipse.equinox.p2.type.group" value="true" />
  </properties>
<provides size="1">
  <provided namespace="org.eclipse.equinox.p2.iu" name="myAdditionalProduct" version="0.0.0" />
  </provides>
<requires size="8">
  <required namespace="org.eclipse.equinox.p2.iu" name="myPlatformProduct" range="0.0.0" />
  <required namespace="org.eclipse.equinox.p2.iu" name="MyAdditionalBundle" range="[1.0.0.201203121459,1.0.0.201203121459]" />
  <required namespace="org.eclipse.equinox.p2.iu" name="config.a.jre.javase" range="[1.6.0,1.6.0]" />
  <required namespace="org.eclipse.equinox.p2.iu" name="tooling.org.eclipse.update.feature.default" range="[1.0.0,1.0.0]">
    <filter>(org.eclipse.update.install.features=true)</filter>
    </required>
  <required namespace="org.eclipse.equinox.p2.iu" name="a.jre.javase" range="[1.6.0,1.6.0]" />
  <required namespace="org.eclipse.equinox.p2.iu" name="tooling.source.default" range="[1.0.0,1.0.0]" />
  <required namespace="org.eclipse.equinox.p2.iu" name="tooling.osgi.bundle.default" range="[1.0.0,1.0.0]" />
  <required namespace="org.eclipse.equinox.p2.iu" name="toolingmyAdditionalProduct.configuration" range="raw:[-M,-M]" />
  </requires>
  <touchpoint id="org.eclipse.equinox.p2.osgi" version="1.0.0" />
  <touchpointData size="1" />
  </unit>
......
```

In one embodiment, a root installable unit of the IUs described in the application metadata 230 may correspond to the application product. For instance, the root installable unit for the application metadata can be the unit with id="myAdditionalProduct" presented in Table 6.

After publishing the product description 240 and the product reference 245, the application metadata 230 is updated and describes IUs that are sufficient for provisioning the software application in the cloud environment. In one embodiment, a composite repository 255 is created in the application repository 225 that includes composite metadata. The composite repository 255 can be a composite p2 repository that stores metadata comprising one or more IUs. The IUs describe functionality delivered by plugins and features. In one embodiment, the composite repository 255 refers to the application repository 225 and a platform product, such as platform product 250. In another embodiment, the reference to the platform product can be defined by a reference to the repository that includes the platform product 250. The reference to the application repository and the platform product can be defined as relative paths (not stating the full path to the location, e.g. "../ref"). In another embodiment, the references can be defined as absolute paths. Further, the references can be defined in a combination of relative paths and absolute paths. For example, the reference to the application repository can be based on a relative path, and the reference to the platform product can be based on absolute path (e.g. uniform resource identifier (URI)). In one embodiment, the composite metadata can be defined in a file with XML format. Table 7 and Table 8 presented below show exemplary composite metadata in metadata files "compositeContent.xml" and "compositeArtifact.xml".

TABLE 7 compositeContent.xml

```
<?xml version="1.0" encoding="UTF-8" ?>
  <?compositeMetadataRepository version='1.0.0'?>
<repository name=""Extended product Site"" type="org.eclipse.equinox.internal.p2.metadata.repository.CompositeMetadataRepository" version="1.0.0">
  <properties size="1">
    <property name="p2.timestamp" value="1243822502499" />
    </properties>
  <children size="2">
    <child location="addons" />
    <child location="base" />
    </children>
  </repository>
```

TABLE 8 compositeArtifacts.xml

```
<?xml version="1.0" encoding="UTF-8" ?>
  <?compositeArtifactRepository version='1.0.0'?>
<repository name=""Extended product Site"" type="org.eclipse.equinox.internal.p2.artifactrepository.CompositeArtifactRepository" version="1.0.0">
  <properties size="1">
    <property name="p2.timestamp" value="1243822502440" />
    </properties>
  <children size="2">
    <child location="addons" />
    <child location="base" />
    </children>
  </repository>
```

In one embodiment, the composite metadata points to location where the application product and platform product are accessible. For example, the location of the application product can be a p2 repository, such as the application repository 225. Respectively, the platform product can be accessed from a separate repository that can be accessed over a network connection. In one embodiment, the platform product can be located at a platform repository 260 that is provided by the cloud computing platform. In one embodiment, the cloud computing platform may refer to one or more connected computer systems that provide necessary environment for development, deployment and starting of a software product, such as an Eclipse®-based product. In one embodiment, the composite repository 255 can be placed at a location accessible by the cloud computing platform or as part of the cloud computing platform. In one embodiment, the composite repository 255 refers to the application artifacts by pointing to the application repository 225 that is publishing for the application artifacts 205 that are received for deployment. The composite repository 255 refers separately to the platform product 250 that provides the required functionality from the application repository which is declared in the application metadata. The separation of the references can be applied when changes to the application artifacts are made without any change in the platform product, or vice versa. In addition, for example, by separating the platform provided functionality from the application artifacts and referring to them by using the product definitions and repository locations can minimize the application storage on the platform repository 260.

In one embodiment, the application repositories, such as the application repository 275, keeps the application artifacts 235, the application metadata 230, the product description 240, the product reference 245, and the composite repository. In one embodiment, the application repository 275 refers to the platform product with a relative path. Respectively, the application repository 275 refers to the application product with a relative path in another embodiment. In another embodiment, the platform product 250 can be deployed on the platform repository 260 from a set of repositories, for example p2 repositories. The set of repositories can include a repository containing software artifacts providing functionality for an enterprise service, e.g. mail service, etc. In another embodiment, the set of repositories can include a repository providing runtime environment. Additionally, the repository providing runtime environment can provide configuration information required to execute a software application in a cloud environment.

In one embodiment, a software application that is based on a cloud computing platform can be deployed, installed and started on virtual machines (VMs) and then can serve users' requests through a network. In one embodiment, a request can be received to start and install the software application on a VM. For example, the request can be an end user's request or a request from the IDE used for developing the software application. In another embodiment, the software application can be started on a target server that can be defined in the platform product that is provided from the cloud computing platform. The target server can be an application server, for example Java® application server. In another embodiment, an input can be received that can request restarting of the software application installed on the target server on the VM. In another embodiment, the restarting operation can include updating the application artifacts (e.g. binaries) of the application product that is defined for the software application. The restarting operation can also include updating the platform-provided functionality coming from a platform product, such as the platform product 250. In one aspect, the functionality developed for the software application can be updated separately from the functionality provided by the cloud computing platform.

In one embodiment, the platform repository 260 can provide platform spaces. In one embodiment, a space can be a logical entity for separation, such as an account that a customer of a cloud computing platform can receive. For example, customers can use a space for their own business needs by creating different applications in the space. In one embodiment, a platform space_1 265 can be used for the deployment of the application artifacts 205 on the cloud computing platform. In one embodiment, the application repository 225 is transferred to the platform space_1 265 in an application 270 that is part of the platform space_1. The application repository 225 is transferred in the application 270. Therefore, the platform space_1 265 includes an application repository 275 that corresponds to the application repository 225.

Figure 3:
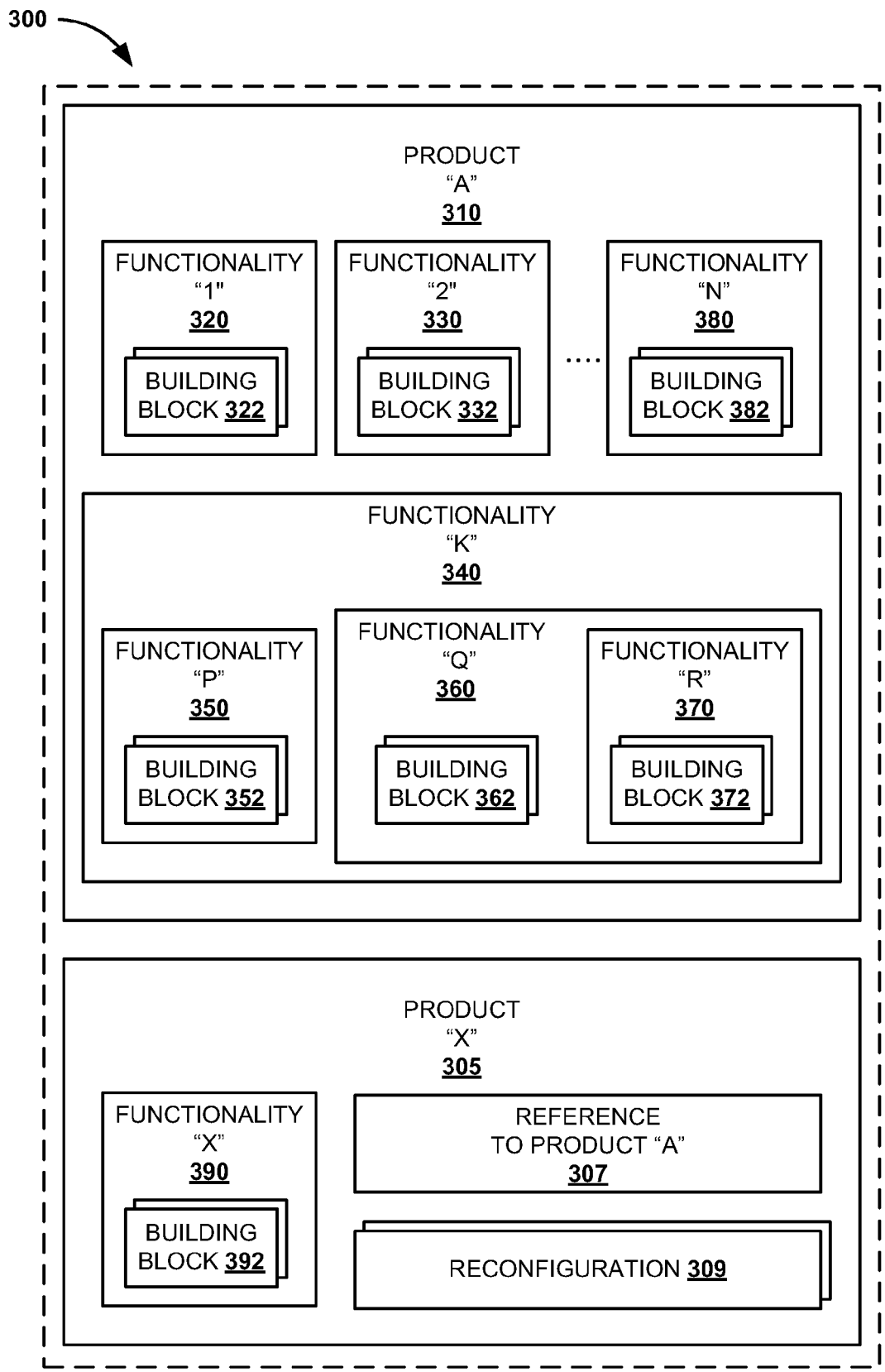
FIG. 3 is a block diagram illustrating a software product structure, according to one embodiment.

FIG. 3 is a block diagram illustrating a software product structure 300, according to one embodiment. Base product 'A' 310 that encompasses a number of functionalities, including functionality '1' 320, functionality '2' 330, functionality 'K' 340, functionality 'P' 350, functionality 'O' 360, functionality 'R' 370 and functionality 'N' 380. Functionality may be determined by one or more building blocks, such as building blocks 322, 332, 352, 362, 372 and 382, accordingly. A building block may represent a logically, functionally or programmatically distinct software component providing a particular element or characteristic of the corresponding functionality. In one embodiment the building blocks can be application artifacts, such as application artifacts 205. In one embodiment, functionality may correspond to a separate software application of a product. For example, if product 'A' 310 is a webserver, functionality '1' 320 may provide user authentication service, functionality '2' 330 may provide email service, functionality 'K' 340 may provide a number of social networking services, etc.

The different functionalities of a product may be related to and dependent on each other. In one embodiment, a hierarchy may be defined between the functionalities, where one functionality is subordinate to, dependent on or included in another functionality. As FIG. 3 shows, functionality 'R' is included in functionality 'Q' 360, which in turn is subordinate to functionality 'K' 340 together with functionality 'P' 350. For example, functionality 'P' 350 could provide messaging service as part of the social network services provided by functionality 'K' 340.

Further, FIG. 3 shows a new application, e.g., functionality 'X' 390 that builds upon product 'A' 310. In other words, the installation and execution of functionality 'X' 390, and respectively the building block 392 of functionality 'X' 390, depend on a preliminary or simultaneous installation of product 'A' 310. For example, functionality 'X' 390 could be an online shopping solution that needs the user authentication service of functionality '1' 320, and the webserver product 'A' 310 provides the runtime environment for both functionality '1' 320 and the new functionality 'X' 390. Accordingly, functionality 'X' 390 cannot be installed as a standalone computer application. First, product 'A' 310 or alternative webserver product should be installed, then the installation of functionalities 'X' 390 and '1' 320, e.g., the shopping solution and the authentication application, could commence. Accordingly, functionality 'X' 390 may be included in product 'A' 310, or a new product could be defined including functionality 'X' 390 and the necessary components of product 'A' 310, e.g., the functionalities and building blocks 320 to 382.

In one embodiment, product 'X' 305 is defined to include functionality 'X' 390 and a reference 307 to product 'A' 310. The definition of product 'X' 305 may also include reconfigurations 309 of one or more of the elements of product 'A' 310 (functionalities and building blocks 320 to 382). For example, the online shopping solution represented by functionality 'X' 390 could be described as the new standalone and self-contained product 'X' 305, where the prerequisite webserver (product 'A' 310) is included in the description of product 'X' 305 by reference 307, without copying the definitions and the descriptions of product 'A' 310 and its components 320 to 340, except for the differences (the reconfiguration 309).

Figure 4:
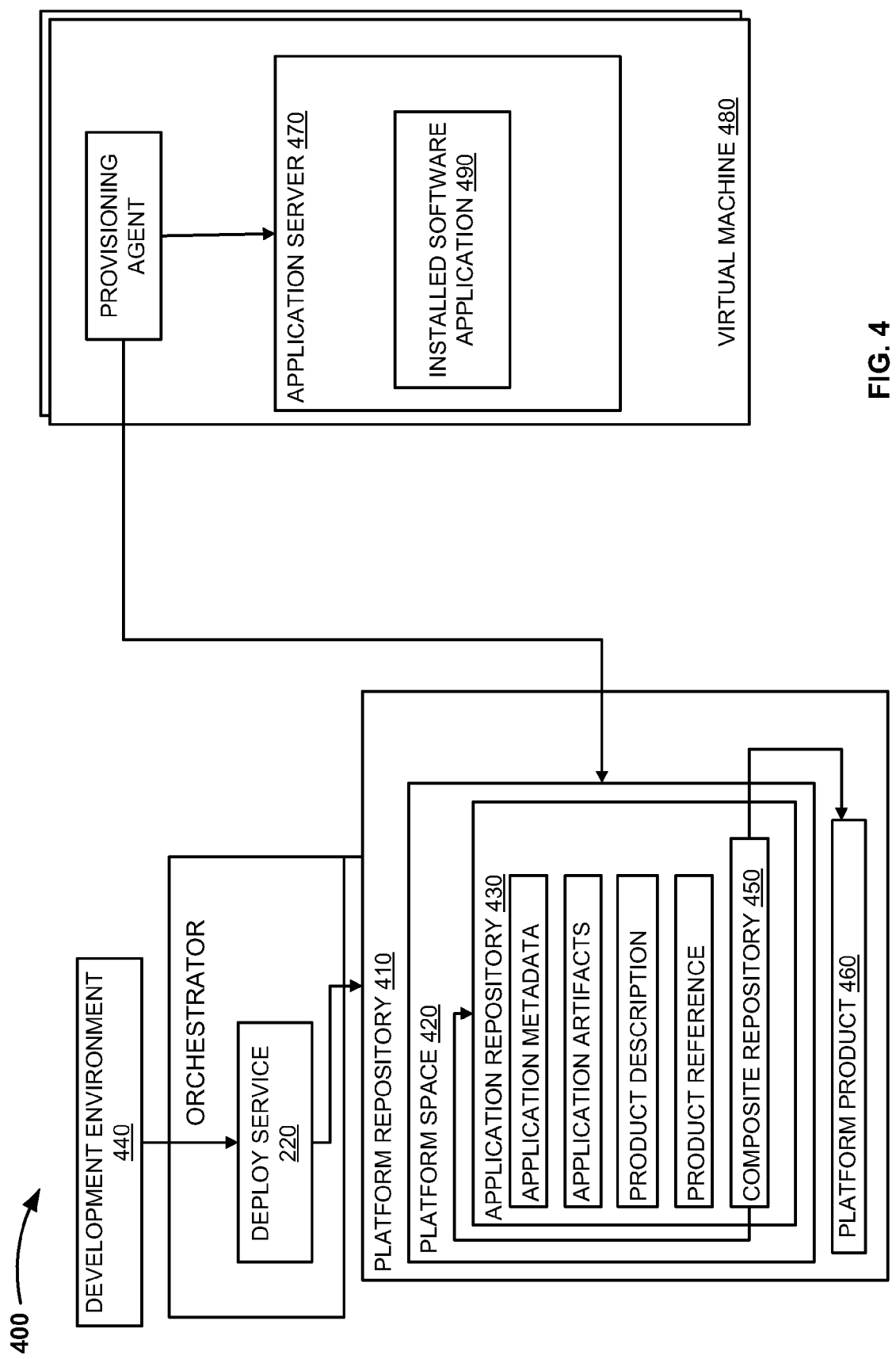
FIG. 4 is a block diagram illustrating an embodiment of an environment for starting a deployed software application on a cloud computing platform providing a platform product.

FIG. 4 is a block diagram illustrating an embodiment of an environment 400 for starting a deployed software application on a cloud computing platform providing a platform product. When a software application is deployed and started, it becomes accessible for end users. When the software application is deployed as a web application on a cloud computing platform, it is provided to the end users as a SaaS. A deployed software application can be accessible on a platform repository 410 provided by a cloud computing platform. The deployed software application can be located on a platform space 420 in an application repository 430. The platform repository 410, the platform space 420, and the platform repository 430 can be ones such as the platform repository 125, the platform space_1 265, and the application repository 275 in FIG. 2. In one embodiment, the deploy service 220 is used to deploy application artifacts from a development environment 440. The application repository 430 has a structure equivalent to the structure of the application repository 275 in FIG. 2.

The composite repository 450 includes references to the application repository 430 and the platform product 460. The references can be defined to the repositories that contain the application artifacts part of the application product and the repositories that contain the artifacts part of the platform product. When starting, the software product defined in the application repository 430, an installed software application 490 is located on an application server 470 on a virtual machine 480. In one embodiment, the installed software application 490 can be a business application that provides services to the end user via a network communication by using a web browser. In another embodiment, the installed software application 490 incorporates the functionality provided by the platform product that persists in the requirements of the application artifacts that are developed for the software application. The installed software application 490 can be restarted which will induce a new installation of the software application by reading from the composite repository 450 the references to the included products. If there is a change in the definition of the platform product 460 or a separate change in the definition of the application product, the change will be inherited in the restarted software application. In one embodiment, the change in the definition of the platform product 460 can be a change in the implementation of provided enterprise services, or new enterprise services, defined in the platform product. In another embodiment, the change can be in the definition of the application product, which can require additional functionality, when an update to the implementation of the application artifacts is made.

Figure 5:
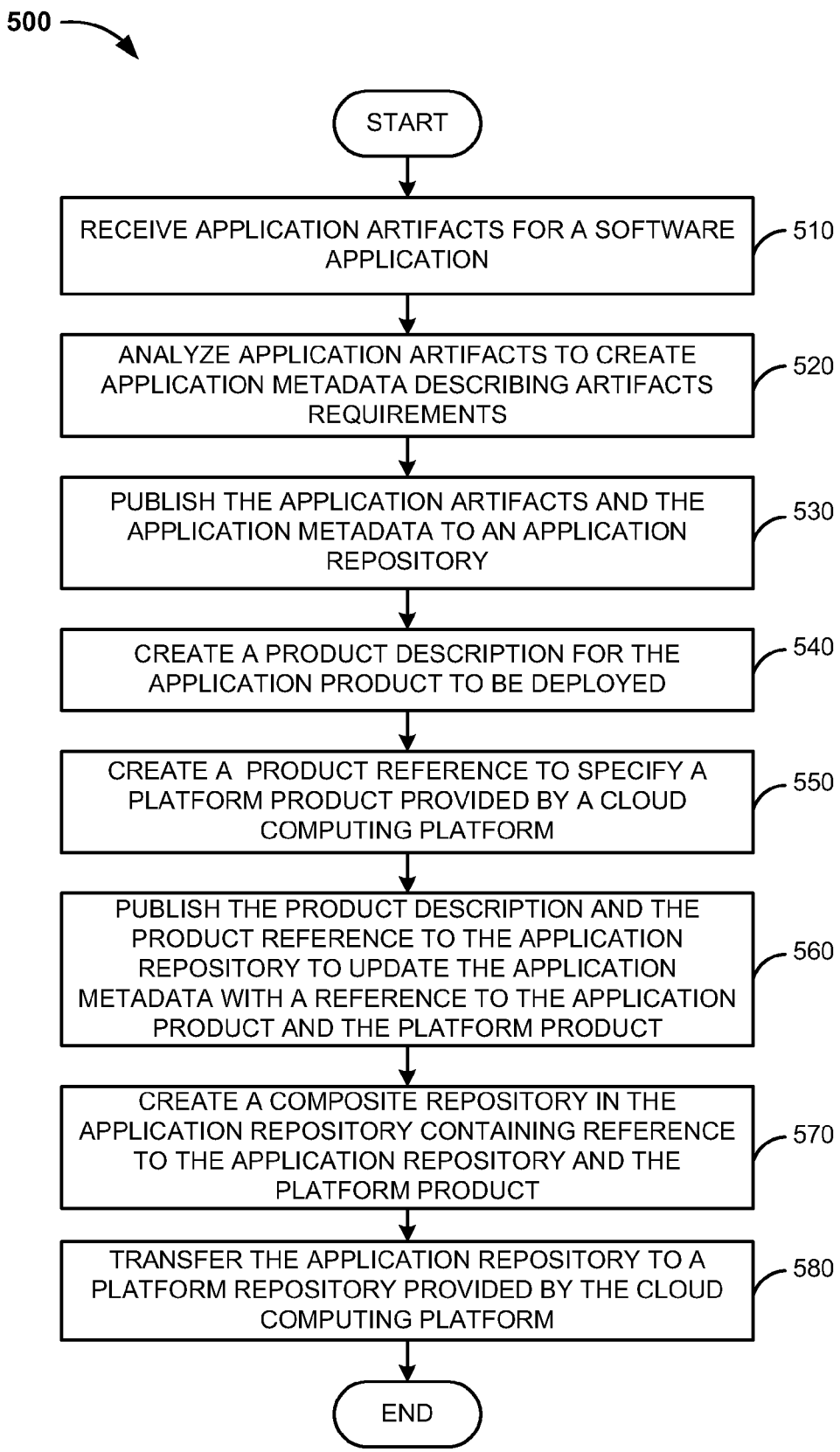
FIG. 5 is a flow diagram illustrating an embodiment of a method for deployment of a software application on a cloud computing platform that provides a platform product.

FIG. 5 is a flow diagram illustrating an embodiment of a method 500 for deployment of a software application on a cloud computing platform that provides a platform product. At process step 510, application artifacts are received for a software application. In one embodiment, the software application can be a web business application that is built upon a cloud computing platform. The software application uses part of the provided functionality from the cloud computing platform according to the application needs. The software application can be developed in an IDE that is provided by the provider of the cloud computing platform, or by another provider. In one embodiment, the application can be an OSGi™-based application. In one embodiment, the cloud computing platform can provide a defined platform product. The platform product can provide functionality associated with providing enterprise services, runtime environment, configuration information, etc.

At step 520, the application artifacts are analyzed and application metadata is created to describe the application artifacts requirements. At step 530, the application artifacts are published together with the application metadata onto an application repository, such as the application repository 225 in FIG. 2. At step 540, a product description is created for the application product that is being deployed. In one embodiment, the product description is such as the product description 240 in FIG. 2. At step 550, a product reference is created to specify a platform product that can satisfy the application artifact requirements and the platform product is provided by a cloud computing platform. At step 560, the product description and the product reference are published to the application repository and thus the application metadata is updated. The updated application metadata refers to the application product and the platform product. At step 570, a composite repository is created in the application repository that includes references to the application repository and the platform product. In one embodiment, the references to the platform product can be defined by a reference to the repository that contains the platform product. At step 580, the application repository is transferred to a platform repository that is provided by the cloud computing platform.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 6:
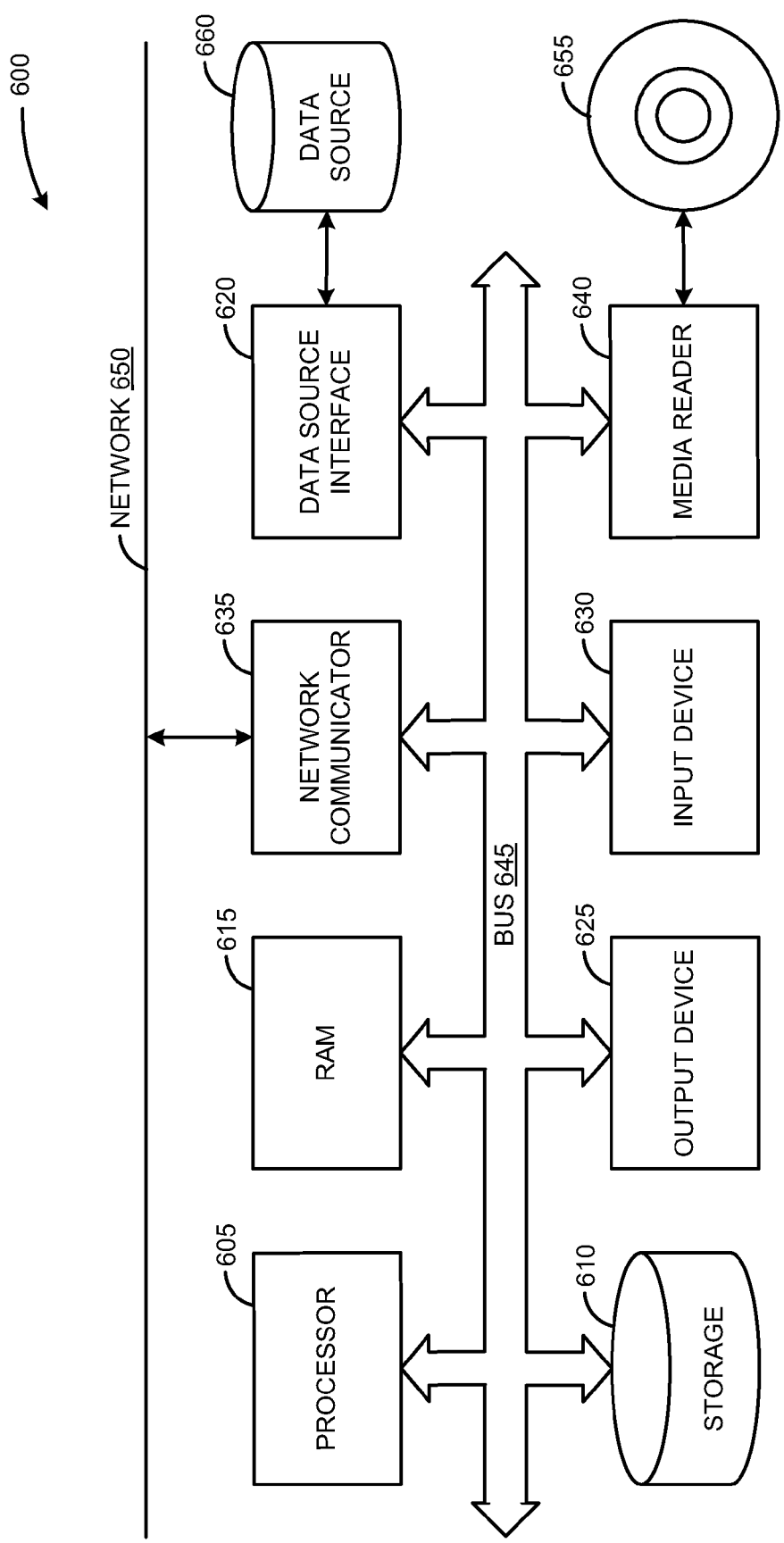
FIG. 6 is a block diagram illustrating an embodiment of a computing environment in which the techniques described for deployment of a software application on a cloud computing platform that provides a platform product can be implemented.

FIG. 6 is a block diagram of an exemplary computer system 600. The computer system 600 includes a processor 605 that executes software instructions or code stored on a computer readable storage medium 655 to perform the above-illustrated methods of the invention. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data-Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer-implemented method to deploy a software application based on functionality provided in a platform product on a cloud computing platform, the method comprising:

analyzing application artifacts for the software application to create application metadata describing application artifacts requirements;

publishing the application artifacts and the application metadata onto an application repository;

creating a product description defining an application product for the software application to be deployed on the cloud computing platform, wherein the application product defines the application artifacts, and wherein the application product is based on the platform product provided onto a platform repository by the cloud computing platform;

creating a product reference to specify the platform product, wherein the platform product satisfies the application artifacts requirements;

publishing the product description and the product reference onto the application repository to update the application metadata with reference to the application product and the platform product;

creating a composite repository in the application repository, the composite repository comprising composite metadata to refer to the application artifacts on the application repository and to the platform product on the platform repository; and transferring the application repository to the platform repository.

2. The method of claim 1, wherein the platform repository is available on a network location.

3. The method of claim 1, wherein the platform product comprises a runtime environment, a set of enterprise services, and configuration information.

4. The method of claim 3, wherein the platform product comprises platform metadata referring to a set of repositories separately maintaining the set of enterprise services and the runtime environment.

5. The method of claim 1, further comprising:
receiving a request to start and install the software application on a target server provided by the platform product.

6. The method of claim 5, further comprising:
receiving input restarting the software application, wherein restarting comprises separately updating the application artifacts of the application product and the platform product.

7. The method of claim 1, wherein referring to the application artifacts on the application repository and the platform product from the composite metadata is based on relative paths.

8. A computer system to deploy a software application based on functionality provided in a platform product on a cloud computing platform, the system comprising:
a memory to store computer executable instructions; and
a processor coupled to the memory and operable to execute the instructions to:
analyze application artifacts for the software application to create application metadata describing application artifacts requirements;
publish the application artifacts and the application metadata onto an application repository;
create a product description defining an application product to be deployed, wherein the application product defines the application artifacts, and wherein the application product is based on the platform product provided onto a platform repository by the cloud computing platform;
create a product reference to specify the platform product, wherein the platform product satisfies the application artifacts requirements;
publish the product description and the product reference onto the application repository to update the application metadata with reference to the application product and the platform product;
create a composite repository in the application repository, the composite repository comprising composite metadata to refer to the application artifacts on the application repository and the platform product on the platform repository; and
transfer the application repository to the platform repository.

9. The system of claim 8, wherein the platform repository is available on a network location.

10. The system of claim 8, wherein the platform product comprises a runtime environment, a set of enterprise services, and configuration information.

11. The system of claim 10, wherein the platform product comprises platform metadata referring to a set of repositories separately maintaining the set of enterprise services and the runtime environment.

12. The system of claim 8, wherein the memory further stores instruction which when executed by the processor cause the system to:
receive a request to start and install the software application on a target server provided by the platform product.

13. The system of claim 12, wherein the memory further stores instruction which when executed by the processor cause the system to:
receive input restarting the software application, wherein restarting comprises updating the application artifacts of the application product and the platform product.

14. The system of claim 8, wherein referring to the application artifacts on the application repository and the platform product from the composite metadata is based on relative paths.

15. An article of manufacture to deploy a software application based on functionality provided in a platform product on a cloud computing platform, comprising a non-transitory computer readable storage medium including executable instructions, which when executed by a computer, cause the computer to:
analyze application artifacts for the software application to create application metadata describing application artifacts requirements;
publish the application artifacts and the application metadata onto an application repository;
create a product description defining an application product to be deployed, wherein the application product defines the application artifacts, and wherein the application product is based on the platform product provided onto a platform repository by the cloud computing platform;
create a product reference to specify the platform product, wherein the platform product satisfies the application artifacts requirements;
publish the product description and the product reference onto the application repository to update the application metadata with reference to the application product and the platform product;
create a composite repository in the application repository, the composite repository comprising composite metadata to refer to the application artifacts on the application repository and the platform product on the platform repository; and
transfer the application repository to the platform repository.

16. The article of manufacture of claim 15, wherein the platform repository is available on a network location.

17. The article of manufacture of claim 15, wherein the platform product comprises a runtime environment, a set of enterprise services, and configuration information.

18. The article of manufacture of claim 17, wherein the platform product comprises platform metadata referring to a set of repositories separately maintaining the set of enterprise services and the runtime environment.

19. The article of manufacture of claim 15, further comprising instructions, which when executed by a computer, cause the computer to:
receive a request to start and install the software application on a target server provided by the platform product.

20. The article of manufacture of claim 15, wherein referring to the application artifacts on the application repository and the platform product from the composite metadata is based on relative paths.

* * * * *